US008590218B2

(12) United States Patent
Nishikawa et al.

(10) Patent No.: US 8,590,218 B2
(45) Date of Patent: Nov. 26, 2013

(54) FRAME MEMBERS AND STRUCTURE

(75) Inventors: Hiroshi Nishikawa, Tokyo (JP); Norio Nishio, Toyama (JP); Ryoichi Nomura, Toyama (JP); Akihiro Nosaku, Toyama (JP)

(73) Assignee: NIC Autotec, Inc., Toyama (JP)

( * ) Notice: Subject to any disclaimer, the term of this patent is extended or adjusted under 35 U.S.C. 154(b) by 0 days.

(21) Appl. No.: 13/518,150

(22) PCT Filed: Mar. 26, 2010

(86) PCT No.: PCT/JP2010/055427
§ 371 (c)(1),
(2), (4) Date: Jun. 21, 2012

(87) PCT Pub. No.: WO2011/077763
PCT Pub. Date: Jun. 30, 2011

(65) Prior Publication Data
US 2012/0255241 A1    Oct. 11, 2012

(30) Foreign Application Priority Data
Dec. 24, 2009  (JP) ................................. 2009-293519

(51) Int. Cl.
*E04B 1/00*      (2006.01)
(52) U.S. Cl.
USPC .......................................................... 52/105
(58) Field of Classification Search
USPC ............................................... 52/105, 204.1
See application file for complete search history.

(56) References Cited

U.S. PATENT DOCUMENTS

| | | | | | |
|---|---|---|---|---|---|
| 1,849,412 | A | * | 3/1932 | Strong | 206/321 |
| 3,477,184 | A | * | 11/1969 | Siivola et al. | 52/105 |
| 3,550,244 | A | * | 12/1970 | Utzy et al. | 29/407.05 |
| 4,201,019 | A | * | 5/1980 | Jones | 52/15 |
| 6,622,441 | B2 | * | 9/2003 | Miller | 52/204.1 |
| 7,861,473 | B1 | * | 1/2011 | Green | 52/210 |
| 7,918,054 | B2 | * | 4/2011 | Grafton et al. | 52/92.3 |
| 2004/0000061 | A1 | * | 1/2004 | Tuthill | 33/194 |
| 2004/0016188 | A1 | * | 1/2004 | Berger, Jr. | 52/204.53 |
| 2004/0194417 | A1 | * | 10/2004 | Paul | 52/716.8 |
| 2005/0210770 | A1 | * | 9/2005 | Fackler | 52/105 |

(Continued)

FOREIGN PATENT DOCUMENTS

| | | |
|---|---|---|
| JP | 03-082179 | 8/1991 |
| JP | 04-027054 | 3/1992 |

(Continued)

OTHER PUBLICATIONS

International Search Report PCT/JP2010/055427 dated Apr. 27, 2010, with English translation.

*Primary Examiner* — Joshua J Michener
*Assistant Examiner* — Keith Minter
(74) *Attorney, Agent, or Firm* — Young & Thompson

(57) ABSTRACT

Provided are frame members from which a structure can be efficiently assembled, and a structure using the frame members. On a surface of a vertical frame member 28, there are printed a position identification mark (sectional shape mark) showing the position where a horizontal frame member 34 is to be butted, a nut position identification mark N showing the mounting position of a nut 46 which is to be inserted into a guide groove 22, and a position identification mark showing the mounting position of a bracket 42. The frame members can be efficiently assembled to manufacture a structure, without referring to a drawing for assembly.

10 Claims, 8 Drawing Sheets

(56) References Cited

U.S. PATENT DOCUMENTS

| | | | |
|---|---|---|---|
| 2006/0277841 A1* | 12/2006 | Majusiak | 52/105 |
| 2007/0028537 A1* | 2/2007 | Chuang | 52/204.1 |
| 2008/0010910 A1* | 1/2008 | Baij | 52/105 |
| 2008/0229680 A1* | 9/2008 | Jahn et al. | 52/105 |
| 2009/0120015 A1* | 5/2009 | Smith | 52/105 |

FOREIGN PATENT DOCUMENTS

| | | |
|---|---|---|
| JP | 2002-098115 | 4/2002 |
| JP | 2003-028114 | 1/2003 |
| JP | 2006-299705 | 11/2006 |

\* cited by examiner (a)  (b)

(a)

(b)

(c)

FRAME MEMBERS AND STRUCTURE

TECHNICAL FIELD

The present invention relates to a frame member and a structure, and is useful for efficient assembly of a structure from frame members.

BACKGROUND ART

In machine working plants or like plants, there have been used a base for installing a manufacturing machine or the like, and an apparatus cover for protecting such a machine or the like. In semiconductor plants or like plants, a clean booth has been used so as to install a semiconductor manufacturing apparatus or the like in a clean environment.

These structures such as abase are constructed by attaching doors, wall panels, etc. to a basic frame, which is assembled from a plurality of elongated frame members made of, for example, aluminum extrudate (see, for example, Patent Document 1).

A manufacturer which manufactures such a structure prepares in advance frame members having standardized lengths, shapes, thicknesses, etc., and properly combines a plurality of frame members to manufacture the structure. Such standardization enables efficient manufacture. In addition, the standardization provides an advantage that requests for the specifications of such a structure can be flexibly coped with by means of manufacturing the structure from various frame members.

Assembly of a structure is performed through steps of selecting two frame members to be connected from all parts, checking connection positions of these frame members at which they are connected together, and fixing these frame members with a fixing member. In the step of selecting the frame members, a worker checks part numbers, etc. shown on a drawing for assembly. In the step of checking the connecting positions, the worker determines, through measurement, the actual mounting position of each frame member in accordance with mounting position information (a distance from an end of the frame member, etc.) shown on the drawing.

Since checking work and operation of determining a measurement position are performed through use of a drawing, presently, a considerably long time is needed for assembly of a structure. In addition, since in general aluminum extrudates are uniform in surface condition, a worker may encounter difficulty in distinguishing various frame members from one another. Therefore, in the case where two types of frame members which slightly differ from each other only in length are used, there may arise a problem that the worker erroneously identifies the two types of frame members and performs the assembly incorrectly.

PRIOR ART DOCUMENT

Patent Document

PATENT DOCUMENT 1: Japanese Patent Application Laid-Open (kokai) No. 2006-299705

SUMMARY OF THE INVENTION

Problem to be Solved by the Invention

In view of such circumstances, an object of the present invention is to provide frame members from which a structure can be efficiently assembled, and to provide a structure using the frame members.

Means for Solving the Problem

A first mode of the present invention which achieves the above-described object is a frame member which partially constitutes a structure, characterized in that the frame member has a position identification mark and a member identification mark formed on a surface of the frame member on which another frame member or a fixing member for fixing the other frame member is to be disposed, the position identification mark showing a position at which the other frame member or the fixing member is to be disposed, and the member identification mark being used for identifying the other frame member or the fixing member.

According to the first mode, a worker can perform assembly while viewing the member identification mark printed on the frame member. Therefore, the worker does not erroneously select a frame member or fixing member to be attached. Furthermore, the position identification mark printed on the frame member reduces the time and labor required for finding or determining the mounting position of the other frame member or the fixing member through measurement.

Moreover, during assembly, the worker is not required to refer to a drawing for assembly. Thus, work for checking mounting positions of the frame members, at which they are mounted to each other, with reference to a drawing, and work for determining the actual mounting positions of the frame members through measurement become unnecessary, whereby the time needed for assembly can be reduced greatly.

A second mode of the present invention is a frame member according to the first mode, characterized in that the member identification mark is a sectional shape of the other frame member.

According to the second mode, the frame member can be attached after checking its sectional shape. Even in the case where a frame member which is asymmetrical in sectional shape is used, the worker does not make an error in determining which one of the two end surfaces of each frame member is to be brought into contact with another frame member.

A third mode of the present invention is a frame member according to the first mode or the second mode, characterized in that the frame member includes a guide groove extending in a longitudinal direction and having flanges at an open portion of the guide groove; the fixing member is composed of a metal fitting for attaching another frame member, and a bolt and a nut for fixing the metal fitting, the nut being movable along the guide groove; and the position identification mark shows a mounting position of the metal fitting, a mounting position of another frame member, or a mounting position of the nut along the guide groove.

According to the third mode, the worker readily knows the position of the nut to be attached to the guide groove from the position identification mark showing the mounting position of the nut. Thus, the time and labor required for referring to a drawing and determining the mounting potion of the nut by measuring the distance from one end of the frame member can be eliminated.

A fourth mode of the present invention is a frame member according to any one of the first through third modes, characterized in that the position identification mark or the member identification mark is formed through printing performed by use of an erasable ink.

According to the fourth mode, after a structure is manufactured through assembly of frame members, the position identification mark, etc. can be erased. Therefore, the appearance of the structure can be improved.

A fifth mode of the present invention is a structure which is constituted by use of the frame member according to any one of the first through fourth modes.

According to the fifth mode, a structure whose cost is reduced by shortening the time required for manufacture is provided.

Effect of the Invention

According to the present invention, there are provided fame members which allow efficient assembly of a structure, and a structure which uses the frame members.

MODE FOR CARRYING OUT THE INVENTION

An embodiment of the present invention will now be described. Notably, the embodiment will be described as an illustrative example, and the present invention is not limited to the following description.

Figure 1:
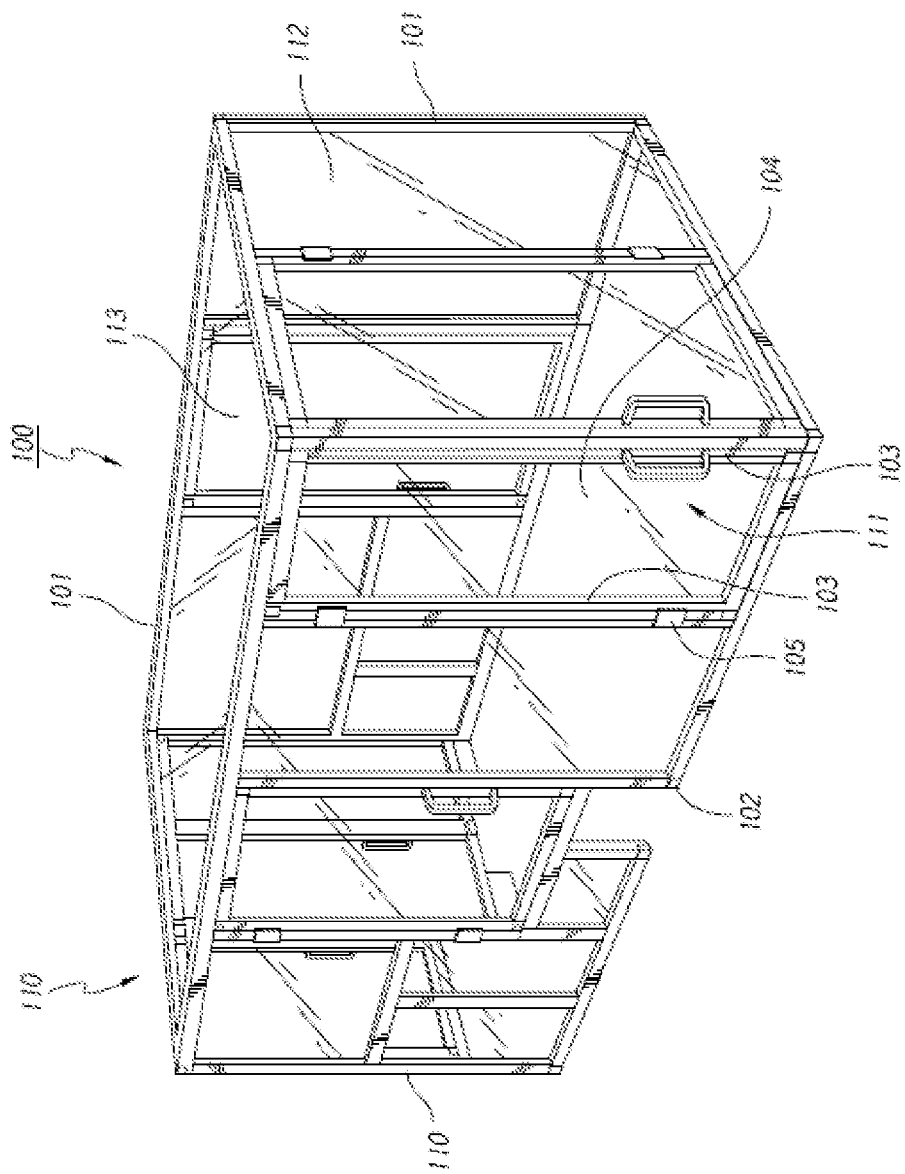
FIG. 1 is a schematic perspective view of an apparatus cover, which is an example of a structure according to an embodiment of the present invention.

An apparatus cover, which is an example of a structure assembled from frame members, will be described with reference to FIG. 1. As shown in FIG. 1, an apparatus cover 100 includes a basic frame 110, which serves as a skeleton thereof; and doors 111, wall panels 112, and a top panel 113, which are attached to the basic frame 110. The basic frame 110 is composed of a plurality of elongated frame members 101, each of which is an aluminum extrudate.

Fixing members 102, including brackets (metal fitting), nuts, bolts, etc., are attached to a location at which adjacent frame members 101 form an L-like shape or T-like shape and are fixed together by the fixing members 102.

The top panel 113 (shown as being translucent in FIG. 1) is attached to a top portion of the apparatus cover 100. Side portions of the apparatus cover 100 are divided into several regions by the frame members 101. The doors 111 and the wall panels 112 (both of which are shown as being translucent in FIG. 1) are installed in corresponding regions. Each of the doors 111 includes a door frame formed by assembling four frame members 103 into a rectangular shape, and a plate-like member 104 (shown as being translucent in FIG. 1) attached to the door frame. The doors 111 are attached to the basic frame 110 via hinges 105.

Such an apparatus cover 100 accommodates therein an apparatus or the like to be protected, enabling protection of the apparatus or the like from the outside environment.

Figure 2:
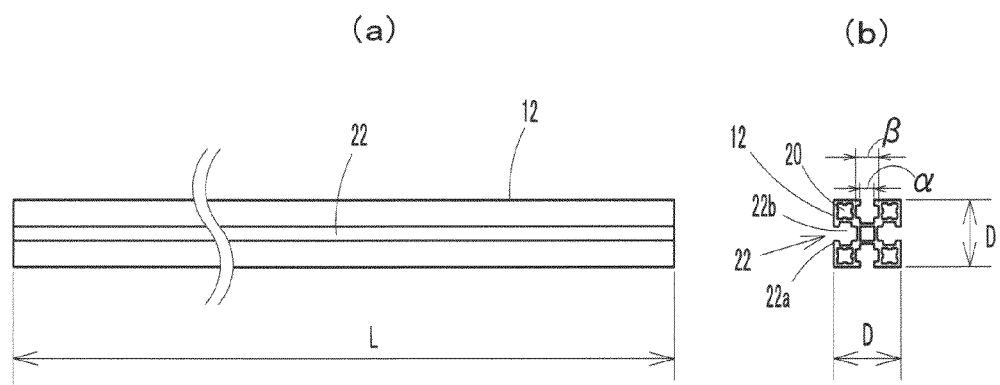
FIGS. 2(a) and 2(b) are plan and sectional views of a frame member according to the embodiment of the present invention.

A frame member according to the embodiment of the present invention will be described with reference to FIG. 2. As shown in FIG. 2, the frame member, which is denoted by 12, is an aluminum extrudate having a length L. The frame member 12 has a square cross section whose sides have a length D. The frame member 12 has hollow openings 20 provided at the center and four corners of the cross section. Furthermore, the frame member 12 has guide grooves 22 which extend from the four sides toward the center of the cross section. Each guide groove 22 is composed of a groove portion 22b, and flanges 22a formed at the opening portion of the groove portion 22b. The width $\alpha$ of the clearance between the flanges 22a is narrower than the width $\beta$ of the groove portion 22b.

A nut for fixing the frame member 12 is attached to the guide grove 22. That is, a nut having a width approximately equal to that of the groove portion 22b is inserted into the groove portion 22b from one end of the frame member 12. This nut is movable along the longitudinal direction of the groove portion 22b, and can be fixed at an arbitrary position along the groove portion 22b. Since the flanges 22a are provided, the nut does not come out of the opening portion of the groove portion 22b.

Now, position identification marks and member identification marks will be described.

Position identification marks are provided on a surface of a certain frame member on which surface other frame members are to be disposed, and show positions at which the other frame members are to be disposed. The position identification marks show the relative positions of other frame members in relation to the certain frame member in the apparatus cover, which is a final structure. The other members are disposed at positions indicated by the position identification marks formed on the certain frame member, whereby the apparatus cover is finally obtained.

Notably, the position identification marks show not only positions at which other frame members are to be disposed but also positions at which fixing members for fixing frame members together are to be disposed. Examples of the fixing members include a bracket, a bolt, a nut, etc.

Member identification marks are provided on each frame member so as to identify other frame members. Each of the member identification marks, which identify other frame members, is a model number designated for each frame member type or the cross-sectional shape of the other frame member.

Notably, each member identification mark may be one for identifying another frame member, or one for identifying a fixing member.

Figure 3:
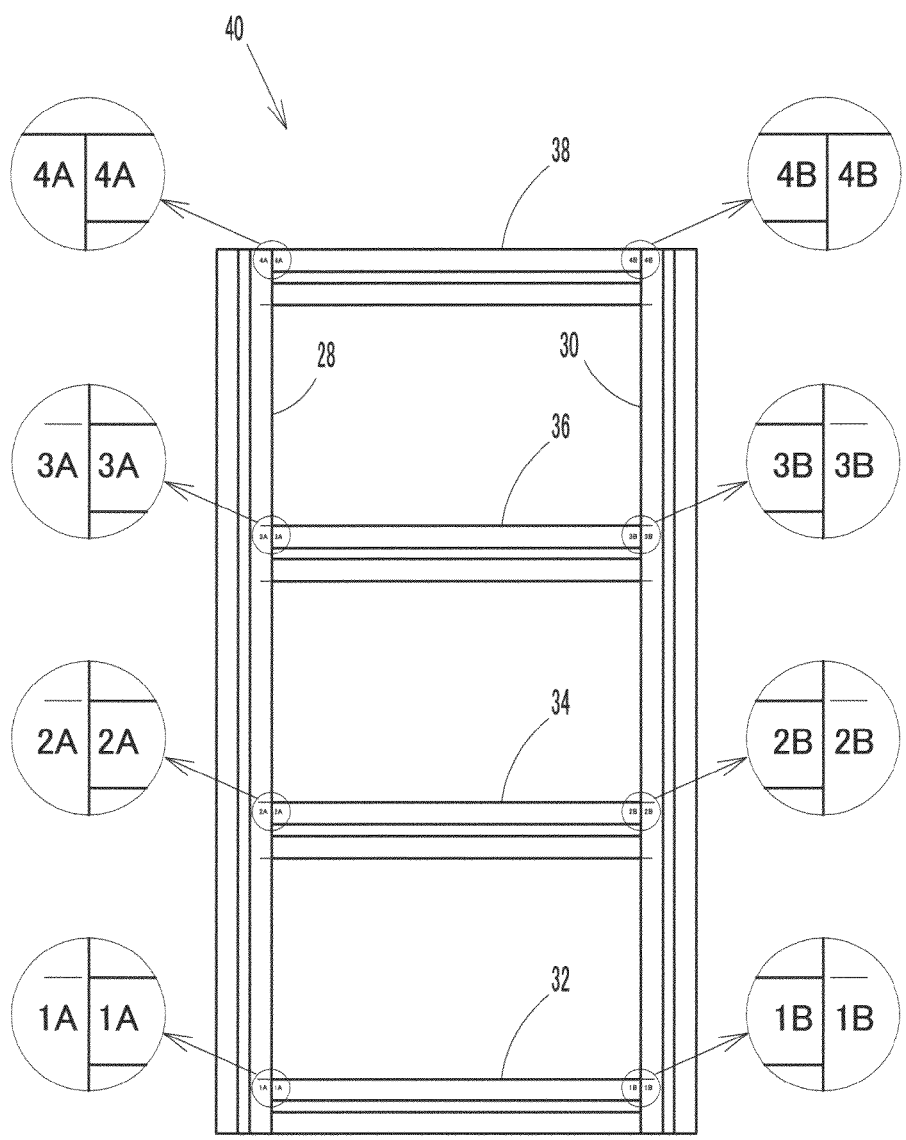
FIG. 3 is a plan view showing position identification marks and member identification marks printed on frame members.
Figure 4:
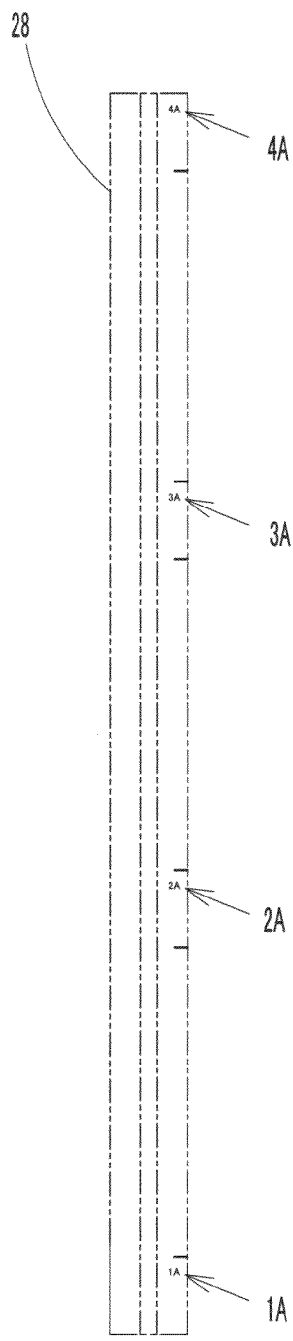
FIGS. 4(a) and 4(b) are plan and side views showing position identification marks and member identification marks printed on a frame member.
Figure 4:
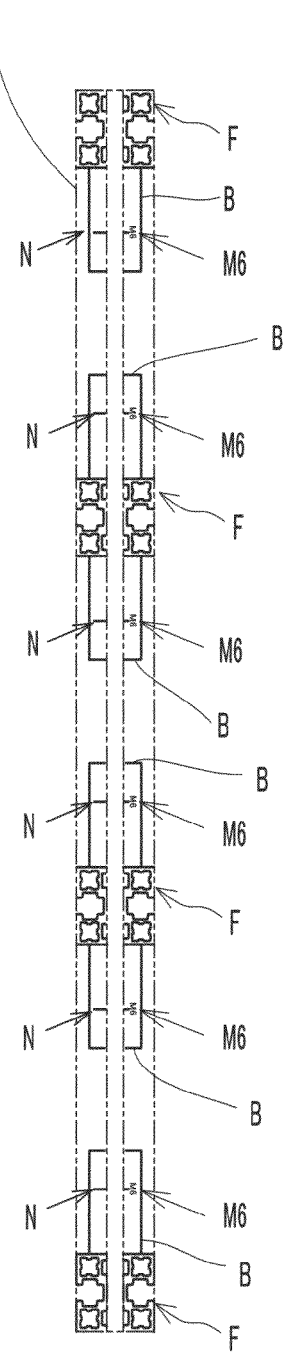
Figure 5:
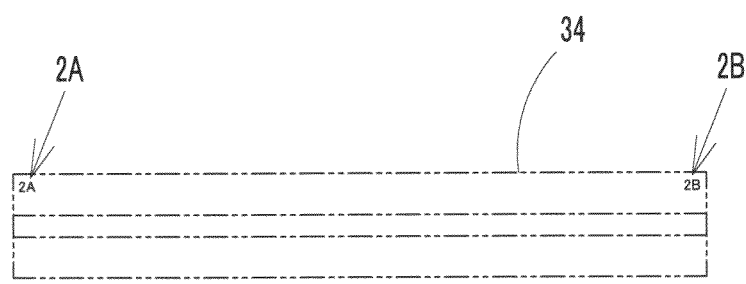
FIGS. 5(a) to 5(c) are plan views each showing a portion of the apparatus cover.
Figure 5:
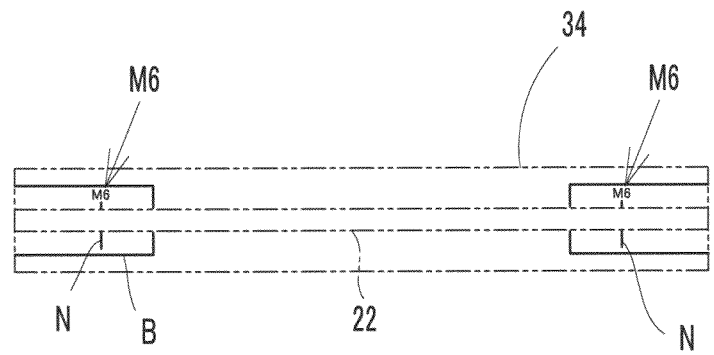
Figure 5:
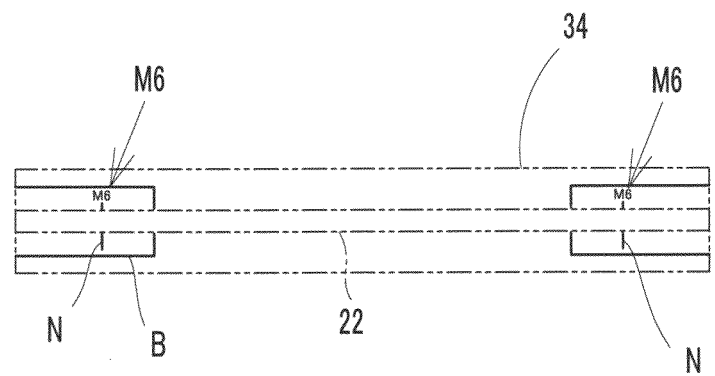

Specific examples of the position identification marks and the member identification marks will be described with reference to FIGS. 3 to 5. As shown in FIG. 3, a basic frame 40, which constitutes a portion of the apparatus cover 100, is composed of two relatively long frame members (hereinafter referred to as "vertical frame members") 28 and 30, and four relatively short frame members (hereinafter referred to as "horizontal frame members") 32, 34, 36, and 38.

Specifically, the frame members 28 to 38 of the basic frame 40 are disposed to form a lattice such that the left end surfaces of the horizontal frame members 32, 34, 36, and 38 butt against the right side surface of the vertical frame member 28 at predetermined locations, and the right end surfaces thereof butt against the left side surface of the vertical frame member 30 at predetermined locations.

As shown in FIG. 4(a), the vertical frame member 28 has character strings "1A," "2A," "3A, and" "4A" (examples of the member identification marks), which are printed on the upper surface of the vertical frame member 28 so as to identify the counterpart horizontal frame members (other frame members) 32, 34, 36, and 38. Since the printing positions of these member identification marks show the butting positions of the counterpart horizontal frame members 32, 34, 36, and 38, the member identification marks may be used as position identification marks for showing their butting positions. However, in the present embodiment, a plurality of short lateral lines are drawn as position identification marks which are easier to see.

As shown in FIG. 4(b), the sectional shapes of the horizontal frame members, which are position identification marks, are printed on the right side surface of the vertical frame member 28 in regions in which the corresponding end surfaces of the counterpart horizontal frame members 32, 34, 36, and 38 butt against the vertical frame member 28 (these printed sectional shapes will be referred to as "sectional shape marks"). Use of such sectional shape marks F is useful for the case where the sectional shapes of the horizontal frame members 32, 34, 36, and 38 are asymmetrical, and the horizontal frame members 32, 34, 36, and 38 must be attached in consideration of their orientations. By virtue of the sectional shape marks F, the orientations of the horizontal frame members 32, 34, 36, and 38 can be determined easily and visually. Moreover, the mounting position of a metal fitting, which is an example of the position identification mark, is printed beside each sectional shape mark F (this printed mounting position will be referred to as a "metal fitting position mark"). This metal fitting position mark B is a line surrounding a region in which a bracket 42 to be described later is to be attached. Moreover, character strings "M6", which are bolt identification marks (member identification marks) each showing the type of bolt used for fixing each counterpart horizontal frame member 32, 34, 36, 38 via the bracket, are printed on the right side surface of the vertical frame member 28. Also, line-shaped nut position marks (position identification marks) N each showing the mounting position of a nut are printed on the right side surface of the vertical frame member 28 to be located on the side of the guide groove 22 opposite the bolt identification marks.

As shown in FIG. 5(a), character strings "2A" and "2B," which are member identification marks showing the counterpart vertical frame members 28 and 30, are printed on the upper surface of the horizontal frame member 34. Also, these member identification marks also serve as marks for specifying the butting positions of the counterpart vertical frame members 28 and 30 by virtue of their printing positions.

As shown in FIGS. 5(b) and 5(c), the metal fitting position marks B, surrounding respective regions where the brackets 42 to be described later are to be attached, are printed on the front and back surfaces of the horizontal frame member 34. Also, the character strings "M6," which are the bolt identification marks used for the bolts fixing the vertical frame members 28 and 30 via the brackets 42, are printed on the front and back surfaces. Also, line-shaped nut position marks N each showing the mounting position of a nut 46 are printed on the front and back surfaces to be located on the side of the guide groove 22 opposite the bolt identification marks.

Similarly, each of the vertical frame member 30 and the horizontal frame members 32, 36, and 38 has position identification marks, member identification marks, bolt identification marks, and metal fitting position marks printed at predetermined locations.

Notably, these marks are formed through printing performed by use of ink. Examples of ink which can be used include quick-drying, thermally curable ink or UV curable ink which is cured through use of a UV lamp. Alternatively, there may be used ink which can be removed after being cured, by means of wiping off the ink after application of alcohol or solvent thereto. Since this removable ink allows erasure of the marks after assembly of the apparatus cover 100 from the frame members 12, the apparatus cover 100 can have a favorable appearance.

Figure 6:
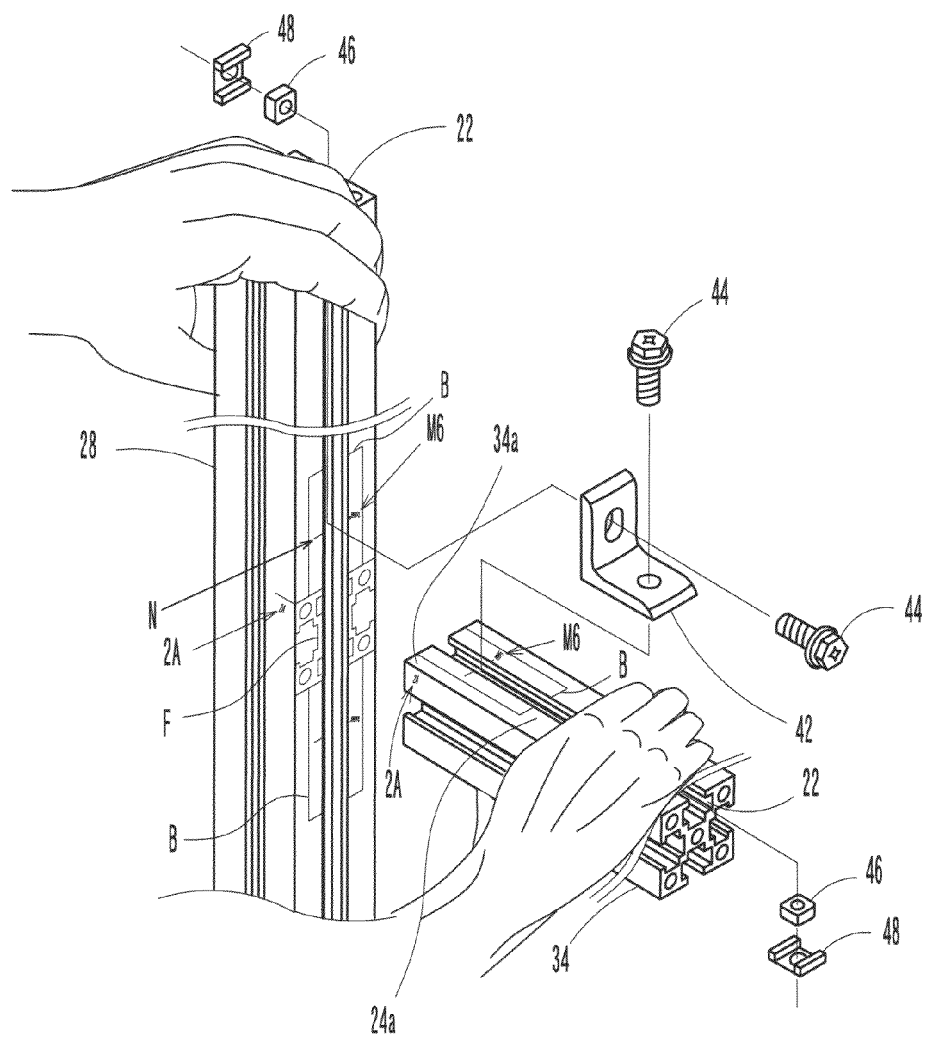
FIG. 6 is a perspective view showing a work of assembling frame members according to the embodiment of the present invention.

A process of assembling frame members having the position identification marks, the member identification marks, etc., printed thereon will be described with reference to FIG. 6.

First, a worker attaches a nut 46 to the guide groove 22 of the vertical frame member 28. Specifically, the nut 46 attached to a nut holder 48 is inserted into the guide groove 22 from one end of the vertical frame member 28. Subsequently, the worker moves and fixes the nut 46 such that the center of the opening of the nut 46 coincides with the nut position identification mark N.

Next, while holding the vertical frame member 28 with the left hand, the worker holds the horizontal frame member 34 with the right hand. Since a member identification mark is printed on each frame member (in the drawing, "2A" is printed on both the frame members), through checking the mark, the worker does not erroneously select another frame member to be attached.

Subsequently, the worker disposes the horizontal frame member 34 on the vertical frame member 28 at a position indicated by the sectional shape mark F. That is, the worker can readily dispose the horizontal frame member 34 without finding a predetermined position of the horizontal frame member by measuring the distance from the end of the vertical frame member 28. Also, at the time of deposition, the worker can check whether the sectional shapes of the horizontal frame members 32, 34, 36, and 38 and the sectional shape mark F of the vertical frame member 28 coincide with each other. Therefore, even in the case where horizontal frame members each having an asymmetrical sectional shape are used, the worker does not make an error in determining which one of the two end surfaces of each horizontal frame member is to be brought into contact with the vertical frame member 28.

Notably, the member identification mark "2A" is printed on each of one side surface of the vertical frame member 28 and one side surface of the horizontal frame member 34. These member identification marks also define the positions of the side surfaces of the vertical frame member 28 and the horizontal frame member 34. That is, when the vertical frame member 28 and the horizontal frame member 34 are positioned such that the marks "2A" appear on the same face or side, the positions of the side surfaces of the horizontal frame member 34 in relation to the vertical frame member 28 are determined univocally.

For example, by means of positioning the vertical frame member 28 and the horizontal frame member 34 such that the marks "2A" appear on the same face, the vertical frame member 28 and the horizontal frame member 34 can have a positional relation therebetween such that a placement surface 34a of the horizontal frame member 34, on which the bracket 42 is to be placed, faces the upper side of the vertical frame member 28 (upward in the drawings). Thus, the worker can attach the horizontal frame member 34 to the vertical frame member 28 without erroneously setting the rotational position of the horizontal frame member 34 about the longitudinal axis thereof. In particular, even in the case where a placement region is printed or a screw hole (not shown) for attaching another member is provided on one side surface only of the horizontal frame member 34, the rotational position of the horizontal frame member 34 is not erroneously determined. Thus, it becomes possible to avoid a situation where the screw hole is directed toward a wrong direction and thus another member cannot be attached correctly. Thus, useless work, such as re-attachment of the horizontal frame member 34, can be eliminated.

Next, the bracket 42 is disposed such that the bracket 42 coincides with the metal fitting position marks B on the vertical frame member 28 and the horizontal frame member 34. This displacement of the bracket 42 can also be performed easily, because the metal fitting position marks B are printed on the vertical frame member 28 and the horizontal frame member 34. Finally, the bolts 44 are screwed into the corresponding nuts 46, whereby the vertical frame member 28 and the horizontal frame member 34 are fixed together.

As described above, when the frame members according to the embodiment of the present invention are assembled, a worker can assemble them while viewing member identification marks printed on the frame members. Therefore, the worker does not erroneously select a frame member or fixing member to be attached. Furthermore, the position identification marks printed on each frame member reduce the time and labor required for determining the mounting positions of other frame members and fixing members (the nut 46, the bracket 42, etc.) through measurement.

Moreover, during assembly, the worker does not need to refer to a drawing for assembly. This is because information which has been provided in conventional drawings is printed on each frame member in the form of position identification marks and member identification marks. In the case of conventional frame members, the mounting positions of the frame members, at which they are to be mounted to each other, are checked with reference to a drawing, and the actual mounting positions of the frame members are determined through measurement. In contrast, in the case of the frame members of the present invention, reference to a drawing and determination of mounting positions through measurement become unnecessary, whereby the time needed for assembly can be reduced greatly.

If no position identification marks are printed, the following problem occurs. In the case of a long frame member having a length of several meters, a certain worker holds one end of a measuring tape at one end of the frame member, and another worker reads the graduation of the measuring tape and determines mounting positions of other frame members. In contrast, in the case of the frame members 12, no workers are required for such determination of mounting positions, whereby cost can be reduced accordingly.

Even for skilled assembly workers, some length of time is needed for referencing a drawing. In contrast, since use of the frame members according to the present invention eliminates the necessity of referring to a drawing, even skilled workers who otherwise have no room for time shortening can shorten assembly time.

As described above, since a worker does not need to refer to a drawing and is prevented from erroneously selecting a frame member or the like to be used, the worker can efficiently manufacture the apparatus cover 100.

Moreover, such assembly which eliminates the necessity of drawings is particularly useful in the case where the apparatus cover 100 is assembled from frame members within a clean room.

Figure 7:
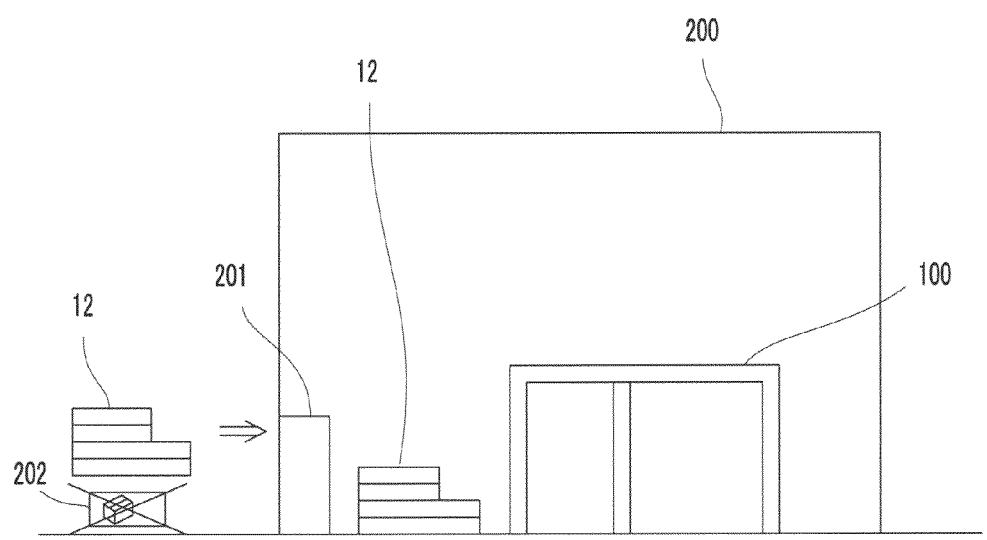
FIG. 7 is a schematic view showing an apparatus cover manufactured in a clean room.

Assembly of the apparatus cover 100 within a clean room will be described with reference to FIG. 7. As shown in FIG. 7, since the apparatus cover 100 according to the present embodiment is composed of a plurality of frame members 12, the frame members 12 can be individually conveyed into the clean room, and the apparatus cover 100, which is larger than an entrance 201, can be assembled within the clean room.

Various restrictions are imposed on such a clean room 200 in order to prevent entry of particles from the outside. For example, one such a restriction is prohibition of taking unnecessary objects into the clean room, no matter how small they are, which is the reason why the entrance 201 is made as small as possible. In particular, in the case where conventional frame members are used, a design drawing printed on a special sheet of paper called dust-free paper is used.

In the present invention, only a set of necessary members, such as the frame member 12, is conveyed into the clean room, and a drawing sheet 202 for assembly does not have to be carried into the clean room. Thus, particles or the like adhering to the drawing sheet 202 are prevented from entering the clean room 200. Also, it becomes unnecessary to use expensive sheets of paper such as dust-free paper. Therefore, cost associated with production of drawing sheets can be reduced, and resources required for producing drawing sheets can be saved, which contributes environmental conservation.

Notably, the above-described position identification marks, member identification marks, etc. can be formed by use of, for example, a printing apparatus which will be described below.

Figure 8:
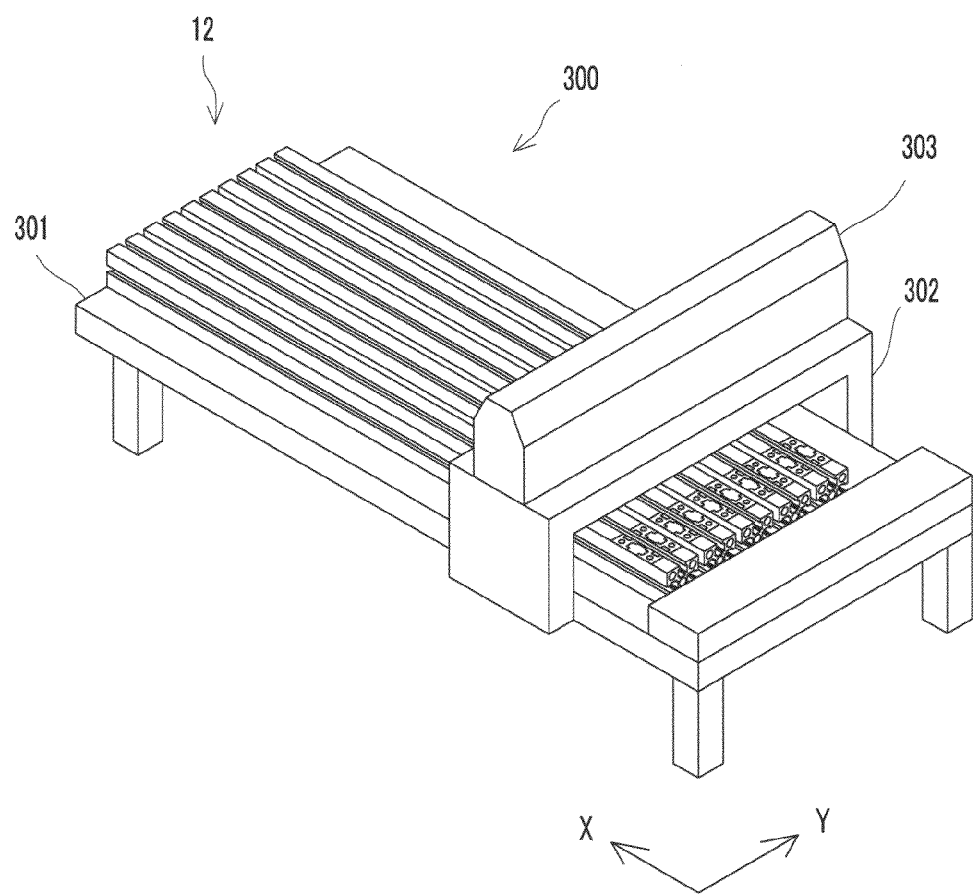
FIG. 8 is a schematic perspective view of a printing apparatus for printing the position identification marks, etc. on frame members.

The printing apparatus will be described with reference to FIG. 8. The printing apparatus, which is denoted by 300, includes a table 301 on which the frame members 12 are placed so as to print drawings, character strings, etc. thereon. Also, the printing apparatus 300 includes a drive mechanism 302 which is movable in an X-axis direction, which is the longitudinal direction of the frame members 12.

A printer unit 303 is disposed on the drive mechanism 302, and moves along the X-axis direction as a result movement of the drive mechanism 302.

The printer unit 303 includes an unillustrated ink tank which is filled with ink, an unillustrated slide rail which extends in a Y-axis direction orthogonal to the X-axis direction, and an unillustrated head drive mechanism. A printer head is slidably mounted on the Y-axis slide rail, and is moved by the head drive mechanism. The printer head receives the ink from the ink tank, and performs a predetermined printing on the frame members 12.

The printing apparatus includes an unillustrated control section. The control section is composed of, for example, a computer having a terminal which can be operated by a worker, and controls the operations of the printer unit and the printer head in accordance with a previously registered program and individual instructions entered by the worker.

Use of the printing apparatus configured as described above enables easy printing of predetermined patterns on the elongated frame members 12.

Other Embodiments

In the above-described embodiment, the position identification marks and the member identification marks are directly formed on the frame members through printing. However, the method of providing these marks is not limited thereto. For example, a position identification mark is printed on a seal, and the seal is bonded to each frame member such that the seal shows the mounting position of another frame member.

INDUSTRIAL APPLICABILITY

The present invention can be utilized in industrial fields in which a structure composed of frame members or frame members themselves are manufactured, sold, or used.

DESCRIPTION OF REFERENCE NUMERALS 12, 101: frame member
22: guide groove
28, 30: vertical frame member
32, 34, 36, 38: horizontal frame member
40: basic frame
42: bracket
44: bolt
46: nut
48: nut holder
100: apparatus cover
102: fixing member
103: frame member
104: plate-like member
105: hinge
110: basic frame
111: door
112: wall panel
113: top panel
200: clean room
201: entrance
202: drawing sheet
300: printing apparatus
301: table
302: drive mechanism
303: printer unit

The invention claimed is:

1. A frame member of a structure, the frame member comprising:
    a frame body having a surface on which other frame members or fixing members for fixing the other frame members is to be disposed;
    a position identification mark formed on the surface of the frame body of the frame member, the position identification mark showing a position at which a first other frame member or the fixing member is to be disposed; and
    a member identification mark formed on the surface of the body of the frame member, the member identification mark being used for identifying the first other frame member or the fixing member, the member identification mark comprising either (i) both a cross-sectional shape and a first particular model number for the first other frame member when the first other frame member has a same cross-sectional shape and a different length as at least a second other frame member or fixing member, and (ii) a second particular model number for the first other frame member when the first other frame member has a different cross-sectional shape than at least a second other frame member or fixing member.

2. The frame member according to claim 1, wherein
    the frame body of the frame member includes a guide groove extending in a longitudinal direction and having flanges at an open portion of the guide groove,
    the fixing member is composed of a metal fitting for attaching the other frame member, and a bolt and a nut for fixing the metal fitting, the nut being movable along the guide groove, and
    the position identification mark shows a mounting position of the metal fitting, a mounting position of the other frame member, or a mounting position of the nut along the guide groove.

3. The frame member according to claim 2, wherein the position identification mark or the member identification mark is formed through printing performed by use of an erasable ink.

4. A structure comprising the frame member according to claim 2.

5. The frame member according to claim 1, wherein the position identification mark or the member identification mark is formed through printing performed by use of an erasable ink.

6. A structure comprising the frame member according to claim 5.

7. A structure comprising the frame member according to claim 1.

8. The frame member according to claim 1, wherein the member identification mark specifically identifies the other frame member or the fixing member.

9. The frame member according to claim 1, wherein the member identification mark specifically identifies a type of the other frame member of the fixing member.

10. The frame member according to claim 1, wherein the member identification mark is designated for a specific shape of frame member.

* * * * *